US011294446B2

(12) United States Patent
Chih et al.

(10) Patent No.: US 11,294,446 B2
(45) Date of Patent: Apr. 5, 2022

(54) NON-WAKEABLE SYSTEM STATES

(71) Applicant: HEWLETT-PACKARD DEVELOPMENT COMPANY, L.P., Spring, TX (US)

(72) Inventors: Poying Chih, Taipei (TW); Raymond Liu, Taipei (TW); Shu Ming Kuo, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,848

(22) PCT Filed: Apr. 20, 2017

(86) PCT No.: PCT/US2017/028577
§ 371 (c)(1),
(2) Date: Oct. 21, 2019

(87) PCT Pub. No.: WO2018/194612
PCT Pub. Date: Oct. 25, 2018

(65) Prior Publication Data
US 2020/0142468 A1 May 7, 2020

(51) Int. Cl.
*G06F 1/3206* (2019.01)
(52) U.S. Cl.
CPC ................. *G06F 1/3206* (2013.01)
(58) Field of Classification Search
CPC ............... G06F 1/3206; G06F 21/81
See application file for complete search history.

(56) References Cited

U.S. PATENT DOCUMENTS

| 4,361,767 | A | * | 11/1982 | Pelka | G08B 13/1672 307/117 |
| 5,758,174 | A | | 5/1998 | Crump et al. | |
| 6,760,850 | B1 | | 7/2004 | Atkinson et al. | |
| 8,352,765 | B2 | | 1/2013 | Bold et al. | |
| 10,671,407 | B2 | * | 6/2020 | Hans | G06F 1/3287 |
| 2003/0145322 | A1 | * | 7/2003 | Song | H04N 5/445 725/26 |
| 2005/0037819 | A1 | * | 2/2005 | Naor | H04W 52/0251 455/574 |
| 2005/0132180 | A1 | * | 6/2005 | Parker | G06F 1/1626 713/1 |
| 2007/0002032 | A1 | * | 1/2007 | Powers | B60K 37/06 345/204 |

(Continued)

OTHER PUBLICATIONS

How to Find Out What Woke Up Your Computer Last, Mar. 25, 2014, < http://lifehacker.com/how-find-out-what-woke-up-your-computer-last-1550549116 >.

(Continued)

*Primary Examiner* — Vincent H Tran
(74) *Attorney, Agent, or Firm* — Rahman, LLC

(57) ABSTRACT

Examples for setting a system state as one of wakeable through a trigger and non-wakeable, are described. In one example, a value of an enabling time interval is obtained. Thereafter, it is determined if the enabling time interval has elapsed since the computing device has been in a low powered mode. Based on the determining, a system state is set as one of wakeable and non-wakeable through a trigger.

15 Claims, 5 Drawing Sheets

(56) References Cited

U.S. PATENT DOCUMENTS

| | | | |
|---|---|---|---|
| 2009/0143062 A1* | 6/2009 | Skinner | H04M 1/72463 455/420 |
| 2009/0322683 A1* | 12/2009 | Tsuji | G06F 1/169 345/168 |
| 2010/0153765 A1 | 6/2010 | Stemen | |
| 2010/0234047 A1* | 9/2010 | Lipovski | H04M 1/72552 455/456.4 |
| 2011/0102682 A1* | 5/2011 | Dai | H04N 21/47 348/730 |
| 2012/0244840 A1* | 9/2012 | Vander Veen | H04W 4/02 455/411 |
| 2013/0080816 A1* | 3/2013 | Johnson | G06F 9/52 713/401 |
| 2013/0086245 A1* | 4/2013 | Lu | G06F 1/3212 709/223 |
| 2014/0068303 A1* | 3/2014 | Hildebrand | H04W 52/0254 713/323 |
| 2014/0148218 A1* | 5/2014 | Lin | G06F 1/325 455/556.1 |
| 2014/0157026 A1 | 6/2014 | So et al. | |
| 2014/0208135 A1 | 7/2014 | Keil et al. | |
| 2014/0240736 A1* | 8/2014 | Tsongas | H04N 1/00413 358/1.13 |
| 2014/0331314 A1* | 11/2014 | Fujioka | G06F 21/10 726/17 |
| 2014/0380075 A1 | 12/2014 | Pulapaka et al. | |
| 2015/0145648 A1* | 5/2015 | Winkelman | B60R 25/24 340/5.72 |
| 2016/0078271 A1* | 3/2016 | Hatcher, II | H04N 5/374 382/124 |
| 2016/0165038 A1 | 6/2016 | Lim et al. | |
| 2016/0274722 A1 | 9/2016 | Putzolu et al. | |
| 2016/0286034 A1* | 9/2016 | Iyer | H04W 12/08 |
| 2017/0208169 A1* | 7/2017 | Day, II | H04L 51/16 |
| 2018/0063716 A1* | 3/2018 | Weigand | H04M 1/72409 |

OTHER PUBLICATIONS

How to Prevent the Mouse or Other Devices From Waking Up Your Computer in Windows 7, 8 and 10, Oct. 11, 2015,< http://www.download3k.com/articles/How-to-prevent-the-Mouse-or-Other-Devices-from-Waking-Up-Your-Computer-in-Windows-7-8-and-10-01412 >.

* cited by examiner

NON-WAKEABLE SYSTEM STATES

BACKGROUND

Any computing device may be switched from an active mode to a low powered mode for conserving power usage. As would be understood, during an active mode all functionalities and features of the computing device may be available. However, during a low powered mode a plurality of functionalities may be suspended. The computing device may enter the low powered mode if it has been running idle for a certain time. Generally, the computing device is 'woken up' or switched back to the active mode when a trigger is detected. An example of a trigger is a manual input or a key-press provided through a keyboard coupled to the computing device.

BRIEF DESCRIPTION OF THE DRAWINGS

The following detailed description references the drawings, wherein.

DETAILED DESCRIPTION

Figure 1:
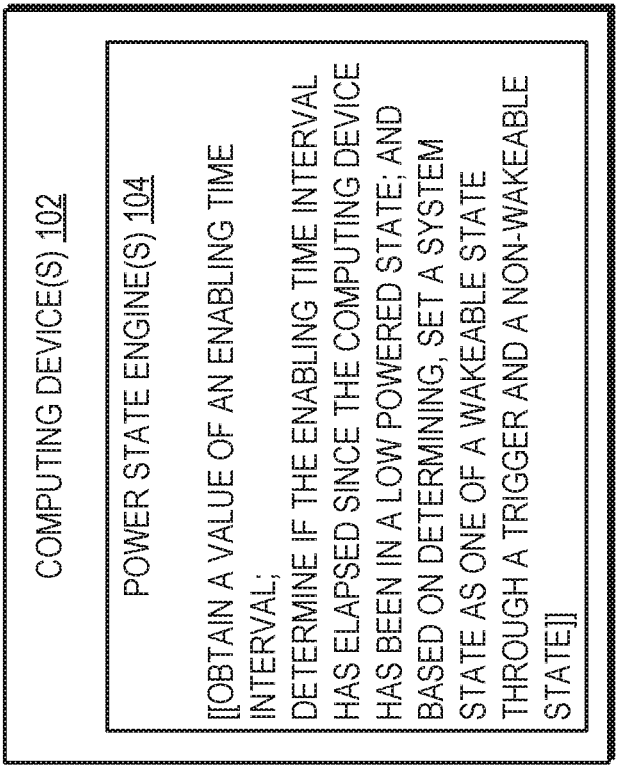
FIG. 1 is a diagram of an example computing device which implements setting a system state as one of wakeable and non-wakeable through a trigger.

Generally, computing devices when in a low powered mode can be woken up or switched to an active mode through one or more triggers. One such trigger involves manually actuating an input device. Examples of such input devices include a keyboard, mouse or trackpad (in case of a laptop) which may be coupled to the computing device. On detecting the input, say a keypress or a mouse click, the computing device is switched from a low powered mode to an active mode. In this manner, a user may simply press a key on the keyboard to wake-up the device, i.e., switch the computing device from a low powered mode to an active mode. It may be possible that the input devices may get accidentally or unintentionally touched or disturbed, which may wake up the computing device. For example, optical mice are generally very sensitive to any movement and may inadvertently wake up the device at instants when it is not intended. Waking up a computing device may involve the computing device lying idle for some time before it may go back into a low powered mode resulting in an unintended power consumption. Furthermore, in case the computing device is powered through chargeable batteries (e.g., laptops or portable computers), such accidental powering up of computing devices may unnecessarily drain the battery power at a higher rate than is intended.

Approaches for controlling the waking up of computing devices are described. Waking up involves switching a computing device from a low powered mode to an active mode. The different powered modes may compliant with the Advanced Configuration and Power Interface (ACPI) specification, which defines various low powered mode the computing device may assume. Examples of low powered modes include, but are not limited to Sleep (S3), Hibernate (S4), or Shutdown (S5) as defined by the Advanced Configuration and Power Interface (ACPI) specification. In one example, the computing device may be so configured such that the devices are 'wakeable', i.e., may be activated by a trigger, only after a certain time interval has elapsed. Once the time interval has elapsed, any trigger received by the computing device switches it from a low powered mode to an active mode. During the time interval the computing device remains non-wakeable and any trigger would not switch the computing device from the low powered mode to an active mode. As would be noted, the time instant at which the computing device is wakeable may be scheduled by a user.

In operation, a value of an enabling time interval is obtained. The enabling time interval may be considered as the time interval during which a user does not intend that the computing device is wakeable through a trigger. The value of the enabling time interval may be defined by way of a user input. Thereafter, the computing device may be switched from an active mode to a low powered mode. The switching may be initiated by a user or may occur after the computing device has remained in an idle state for a predefined time. Once the computing device is switched into a low powered mode a timer may be initiated. The timer is active for a time which corresponds to the enabling time interval. Furthermore, a system state of the computing device is set as non-wakeable. During the time the computing device is non-wakeable, it is configured such that it is not responsive to triggers. As a result, no trigger may switch the computing from the low powered mode to the active mode. Once the enabling time interval lapses, the system state of the computing device is set as wakeable. When the computing device is wakeable, any trigger received by the computing device switches the computing device from the low powered mode to the active mode.

The trigger may be manual or may be initiated through a software. An example of a manual trigger includes, but is not limited to, any manual input through an input device like a mouse or a keyboard. In cases of a laptop, closing or opening of a lid may also be considered as triggers. As would be noted, the present approaches allow the computing device to remain in the low powered mode despite any accidental or unintentional triggers. Only when the enabling time interval lapses, is the computing device wakeable in response to a trigger.

These and other aspects are described in conjunction with FIGS. 1-5. FIG. 1 illustrates a computing device(s) 102 which implements setting a system state as one of wakeable by a trigger, and non-wakeable. The computing device(s) 102 may be considered as any processor enabled device which performs one or more functions. An example of such a computing device(s) 102 include, but are not limited to, desktop computers, laptops and portable computers. The present approaches may also be implemented in other types of computing device(s) 102 without deviating from the scope of the present subject matter. The computing device(s) 102 may be either a standalone device or in communication with other computing devices (not shown in FIG. 1) over a communication network.

Continuing with the present example, the computing device(s) 102 may further include a power state engine(s) 104. In the present example, when the computing device(s)

102 is in a low powered mode, the power state engine(s) 104 obtains a value of an enabling time interval. The value of the enabling time interval may be stored within the computing device(s) 102 and may have been defined by a user. Once the value of the enabling time interval is obtained, the power state engine(s) 104 may further determine if a time corresponding to the value of the enabling time interval has elapsed since the computing device has been in a low powered mode. Based on the determination, the power state engine(s) 104 may set a system state as one of wakeable through a trigger, and non-wakeable. In the non-wakeable state, the computing device(s) 102 does not switch from the low powered mode to an active mode. Conversely, when the system state of the computing device(s) 102 is set as wakeable, the computing device(s) 102 would switch to an active mode from the low powered mode on detecting a trigger. As the computing device(s) 102 is wakeable only after the enabling time interval has elapsed, the computing device(s) 102 is non-responsive towards any triggers.

The triggers in turn may be through one or more components of the computing device(s) 102. For example, the components may be an input device (not shown in FIG. 1) coupled to the computing device(s) 102. A trigger may include either a keypress or a mouse-click, from a keyboard or computer mouse, respectively. The components may in turn be communicatively coupled to the computing device(s) 102 or may be integrated within the circuitry forming a part of the computing device(s) 102 itself. Input devices as components for generating triggers are few examples of many other possible examples. Other examples, such as opening or closing action of a lid or cover of laptop or a tablet computer, would also be included within the scope without any limitations.

Figure 2:
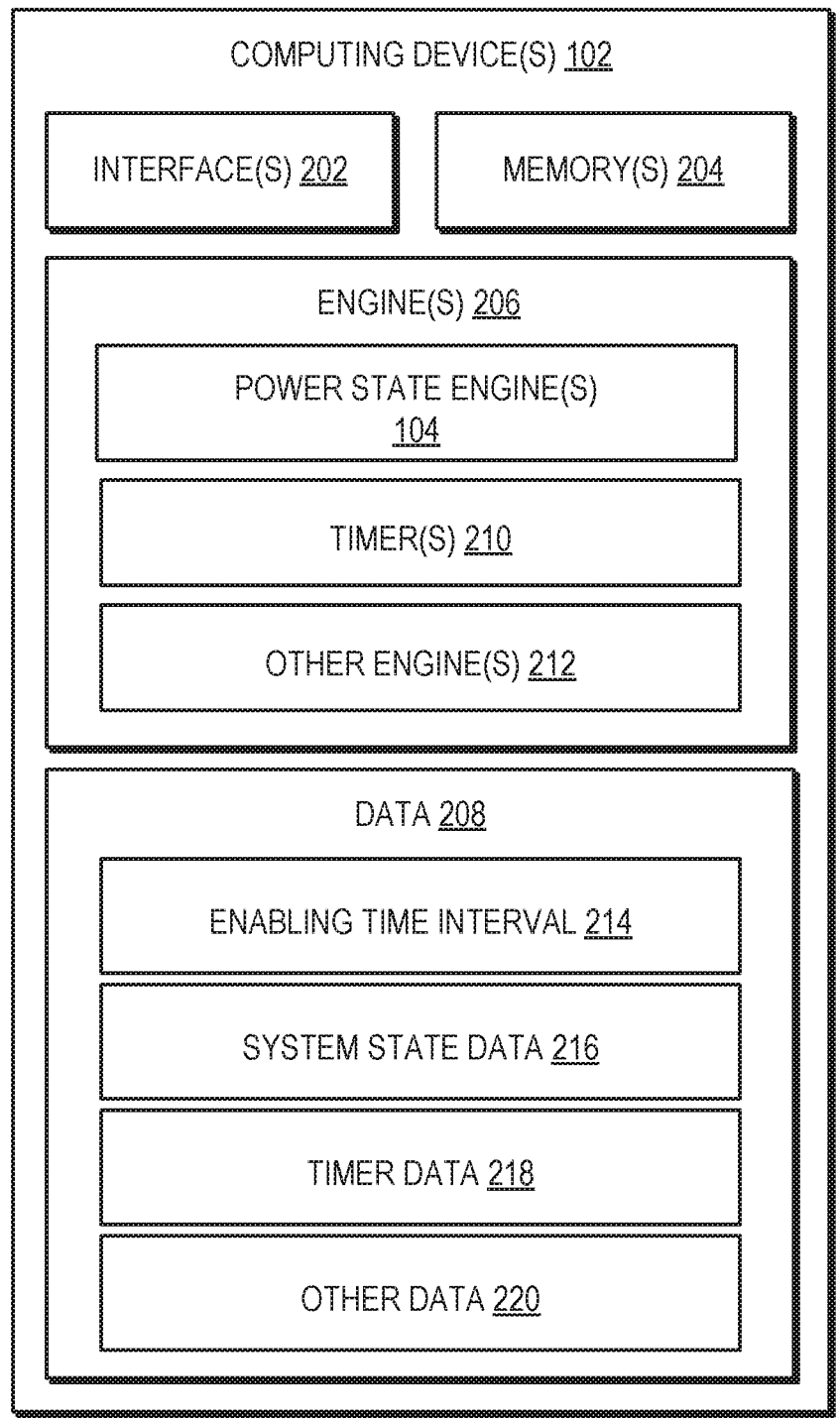
FIG. 2 is a diagram of another example computing device which implements setting a system state as one of wakeable and non-wakeable through a trigger.

FIG. 2 illustrates another example computing device(s) 102 for setting a system state as one of wakeable through a trigger and non-wakeable. The computing device(s) 102 may be implemented as a standalone computing system communicatively connected through a network to other devices. The computing device(s) 102 includes interface(s) 202 and memory 204. The interface(s) 202 may include a variety of interfaces, for example, interfaces for data input and output devices, referred to as I/O devices, storage devices, network devices, and the like. The interface(s) 202 facilitate communication between the computing device(s) 102 and various computing devices connected in a networked environment. The interface(s) 202 may also provide a communication pathway for one or more components of the computing device(s) 102. Examples of such components include, but are not limited to, input device such as keyboards and computer mice.

The memory 204 may store one or more computer-readable instructions, which may be fetched and executed to set a system state as one of wakeable through a trigger and non-wakeable. The memory 204 may include any non-transitory computer-readable medium including, for example, volatile memory such as RAM, or non-volatile memory such as EPROM, flash memory, and the like. The computing device(s) 102 further includes engine(s) 206 and data 208.

The engine(s) 206 may be implemented as a combination of hardware and programming (for example, programmable instructions) to implement one or more functionalities of the engine(s) 206. In examples described herein, such combinations of hardware and programming may be implemented in several different ways. For example, the programming for the engine(s) 206 may be processor executable instructions stored on a non-transitory machine-readable storage medium and the hardware for the engine(s) 206 may include a processing resource (for example, one or more processors), to execute such instructions. In the present examples, the machine-readable storage medium may store instructions that, when executed by the processing resource, implement engine(s) 206. In such examples, the computing device(s) 102 may include the machine-readable storage medium storing the instructions and the processing resource to execute the instructions, or the machine-readable storage medium may be separate but accessible to computing device(s) 102 and the processing resource. In other examples, engine(s) 206 may be implemented by electronic circuitry.

The data 208 includes data that is either stored or generated as a result of functionalities implemented by any of the engine(s) 206. In an example, the engine(s) 206 include the power state engine(s) 104, timer(s) 210 and other engine(s) 212. The other engine(s) 212 may implement functionalities that supplement applications or functions performed by the computing device(s) 102 or engine(s) 206. Further, the data 208 may include enabling time interval 214, system state data 216, timer data 218, and other data 220.

In operation, the power state engine(s) 104 affects setting a system state as one of wakeable through a trigger and non-wakeable. As discussed previously, the power state engine(s) 104 may be implemented as hardware, software or a combination of both. The power state engine(s) 104 may initially retrieve a value of enabling time interval 214. The value of the enabling time interval 214 may be defined by user and may be configured through one or more user interfaces generated by the computing device(s) 102. In one example, the value of enabling time interval 214 is defined at start-up, i.e., when the computing device(s) 102 is booting up from shutdown. In another example, the enabling time interval 214 may be defined as a time instant at which the state of the computing device(s) 102 is to be switched to wakeable state.

Thereafter, the computing device(s) 102 may be used by user for carrying out one or more functions. It may be the case that the user, after having worked on the computing device(s) 102, may not wish to shut-down the computing device(s) 102 but switch it into a low powered mode. An example of such a low powered mode includes, but is not limited to, a sleep mode. The computing device(s) 102 may be put in any other low powered modes, for example, as that prescribed by the Advanced Configuration and Power Interface (ACPI) specification. Examples of low powered modes include, but are not limited to Sleep (S3), Hibernate (S4), or Shutdown (S5) as defined by the Advanced Configuration and Power Interface (ACPI) specification. These examples are only illustrative and other examples may also be used without deviating from the scope of the present subject matter. For some users, switching to a low powered mode is generally preferred as the time taken for the computing device(s) 102 to switch to an active mode from a low powered mode is less as compared to the computing device(s) 102 turning on from a shut-down state.

Returning to the present subject matter, a user may provide a command based on which the computing device(s) 102 switches the computing device(s) 102 into a low powered mode. Once the computing device(s) 102 is switched into the low powered mode, the power state engine(s) 104 may initiate the timer(s) 210. As the timer(s) 210 commences, the power state engine(s) 104 may further set the computing device(s) 102 to a non-wakeable state. While the computing device(s) 102 is in the non-wakeable state, the computing device(s) 102 is rendered unresponsive to any trigger. The trigger may be received through either a manual input on an input device such as a keyboard or a mouse, or may be a software generated trigger, such as those generated by software components that may be still executing in the background while the computing device(s) 102 is in the low powered mode.

The computing device(s) 102 is maintained in the non-wakeable state till a time interval equivalent to the value of the enabling time interval 214 ends. The time elapsed since the computing device(s) 102 had been set to the non-wakeable state is measured and monitored through the timer(s) 210. The power state engine(s) 104 may periodically monitor the timer(s) 210 to determine whether a time corresponding to the value of the enabling time interval 214 has ended. During the enabling time interval 214, the power state engine(s) 104 maintains the computing device(s) 102 in the non-wakeable state. For example, any keypress or mouse clicks would not switch the computing device(s) 102 from the low powered mode to the active mode.

In due course of time, the timer(s) 210 may subsequently expire indicating that the enabling time interval 214 has elapsed. As the enabling time interval 214 lapses, the power state engine(s) 104 may set the computing device(s) 102 to a wakeable state. While in the wakeable state, the computing device(s) 102 may be switched into an active mode from the low powered mode through any trigger. For example, after the enabling time interval 214 has elapsed and the computing device(s) 102 has been set into the wakeable state, any keypress or mouse click switches the computing device(s) 102 from the low powered mode to the active mode. As the computing device(s) 102 is switched into the active mode, execution of the other engine(s) 212 or applications may be initiated. In one example, the applications which are to be initiated as the computing device(s) 102 is switched to an active mode, may be based on the system state data 216. The system state data 216 may indicate information pertaining to the applications which were open or executing at the time the computing device(s) 102 was switched to the low powered mode.

The power state engine(s) 104 may retrieve the system state data 216 and accordingly initiate those applications which were active at the time the computing device(s) 102 was switched to the low powered mode. In this manner, the computing device(s) 102 resumes from the same state when it was switched to the low powered mode. As would be noted, the computing device(s) 102 remains unresponsive to any triggers during the non-wakeable state. In this manner, any accidental or unintentional switching of the computing device(s) 102 to the active mode from the low powered mode are avoided. It should be noted that although the present approach has been described in the context of a computing device, they may be also implemented on any other device with a programmable memory and a processor, without deviating from the scope of the present subject matter.

Figure 3:
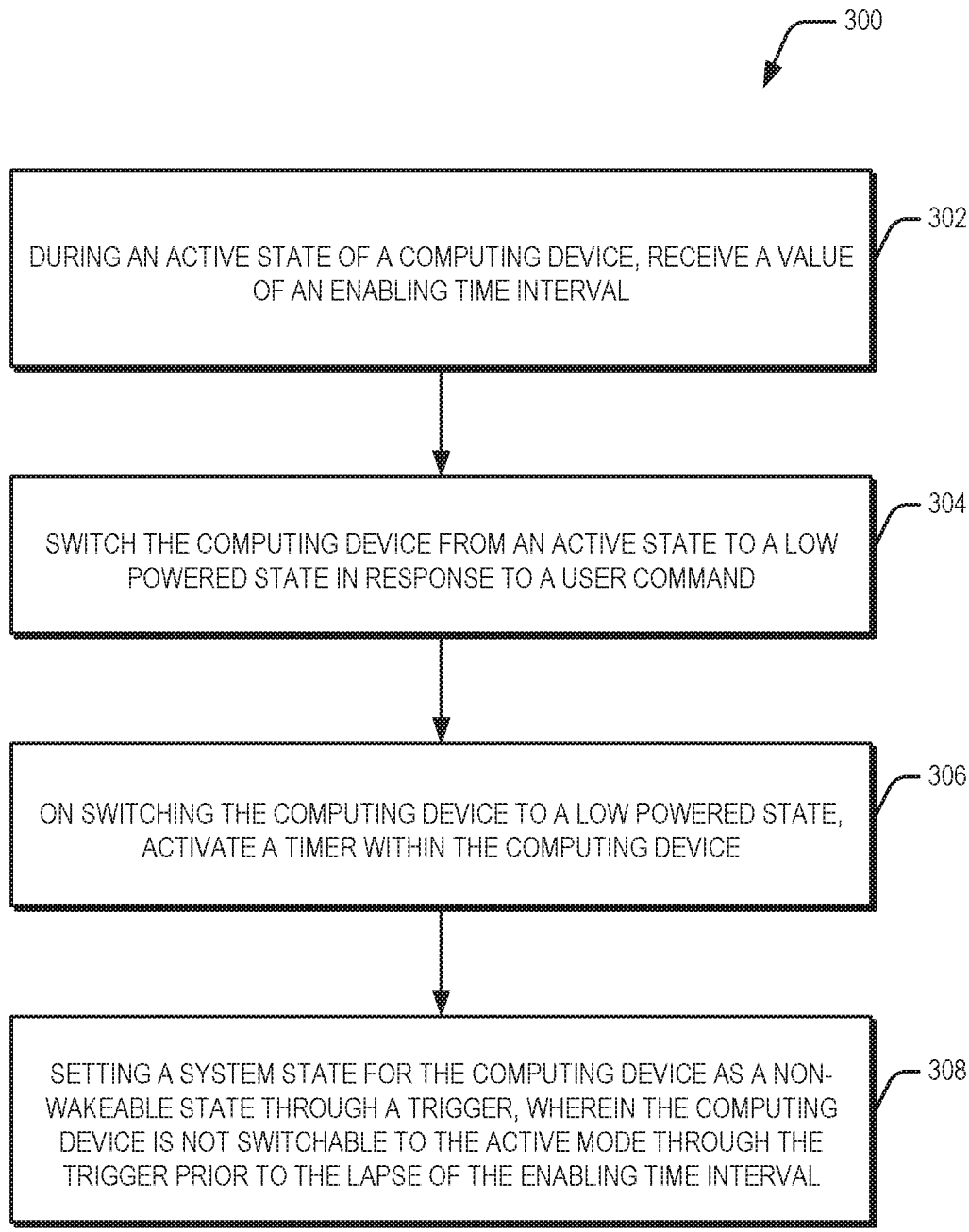
FIG. 3 depicts an example method for setting a system state as one of wakeable and non-wakeable through a trigger.
Figure 4:
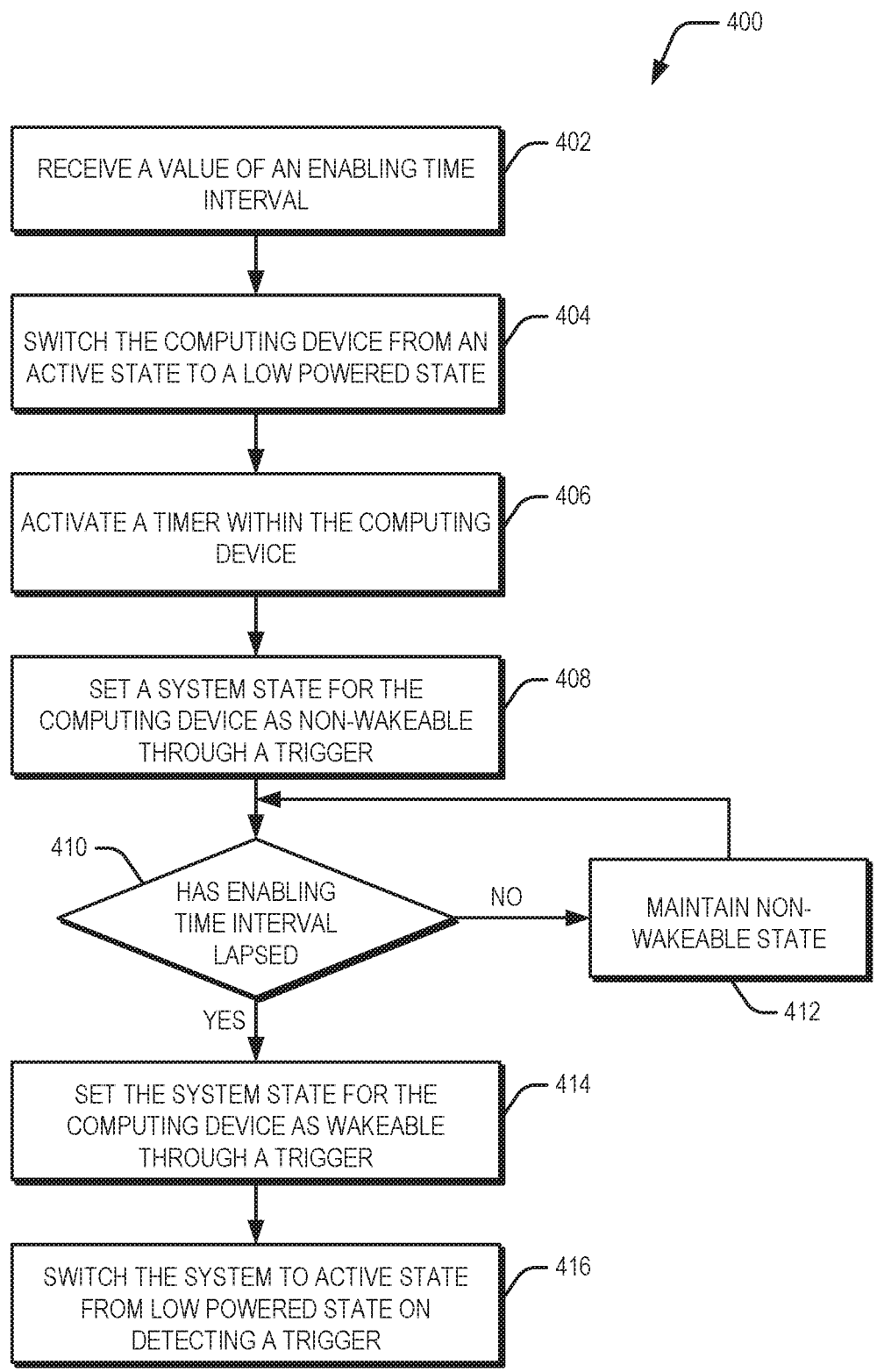
FIG. 4 depicts another example method for setting a system state as one of wakeable and non-wakeable through a trigger.

FIGS. 3-4 illustrate example methods 300 and 400, respectively, for setting a system state as one of wakeable through a trigger and non-wakeable. The order in which the methods are described is not intended to be construed as a limitation, and any number of the described method blocks may be combined in any order to implement the methods, or an alternative method. Furthermore, methods 300 and 400 may be implemented by processing resource or computing device(s) through any suitable hardware, non-transitory machine readable instructions, or combination thereof.

It may also be understood that methods 300 and 400 may be performed by programmed computing devices, such as computing device(s) 102 as depicted in FIGS. 1-2. Furthermore, the methods 300 and 400 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 300 and 400 are described below with reference to computing device(s) 102 as described above; other suitable systems for the execution of these methods may also be utilized. Additionally, implementation of these methods is not limited to such examples.

At block 302, a value of an enabling time interval may be received while a computing device is in an active mode. For example, a user of the computing device(s) 102 may define a value of the enabling time interval 214. The value of the enabling time interval 214 may be configured through one or more user interfaces generated by the computing device(s) 102, at start-up. The enabling time interval 214 may be defined as in terms of the time interval in terms of second, minutes or hours, or may be defined as a time instant at which the computing device(s) 102 is to be switched to wakeable state.

At block 304, the computing device is switched from an active mode to a low powered mode in response to a user command. As would be understood, in the active mode the computing device(s) 102 may be fully functional. Depending on the preference, a user may switch the computing device(s) 102 from the active mode to the low powered mode. The switching may be affected through a user command provided by the user.

At block 306, on switching the computing device to a low powered mode, a timer within the computing device is activated. Once the computing device(s) 102 is switched into the low powered mode, the power state engine(s) 104 may initiate the timer(s) 210. The timer(s) 210 may either determine the time elapsed based on the computer clock of the computing device(s) 102.

At block 308, a system state for the computing device is set as a non-wakeable state through a trigger. Prior to the lapse of the enabling time interval the computing device is not switchable to the active mode through the trigger. For example, the power state engine(s) 104 sets the computing device(s) 102 into a non-wakeable state while the computing device(s) 102 is in the low powered mode. The computing device(s) 102 is rendered unresponsive to any trigger while it is in the non-wakeable state. The trigger may be received through either a manual input on an input device, such as a keyboard or a mouse, or may be a software generated trigger. The computing device(s) 102 in maintained in the non-wakeable state till the enabling time interval 214 lapses.

FIG. 4 provides another example method 400 for setting a system state as one of wakeable through a trigger and non-wakeable. At block 402, a value of an enabling time interval is received. For example, a user of the computing device(s) 102 may provide a value of the enabling time interval 214 through a user interface generated at the computing device(s) 102. The enabling time interval 214 may be defined as in terms of the time interval as second, minutes or hours, or may be defined as a time instant at which the computing device(s) 102 is to be switched to wakeable state.

At block 404, the computing device is switched from an active mode to a low powered mode. A low powered mode may be considered as any mode in which the computing device, such as the computing device(s) 102, has reduced functionality and hence utilizes less power. The low powered mode may be activated through one or more mechanisms. For example, low powered mode may be activated either by pressing the power button of the computing device(s) 102, by closing the lid of a laptop computer, or when the computing device(s) 102 has been idle for a specific time interval. As the computing device(s) 102 is switched to the low powered mode, information pertaining to the application which were open and other such information is obtained and stored as system state data 216.

At block 406, a timer within the computing device may be activated. For example, the power state engine(s) 104 may activate the timer(s) 210 on the computing device(s) 102 being switched to the low powered mode. The method then proceeds to block 408. At block 408, the state of the computing device is set as non-wakeable state through a trigger. For example, the power state engine(s) 104 sets the state of the computing device(s) 102 as non-wakeable state during which the computing device(s) 102 remains unresponsive to any triggers.

At block 410, a determination is made to check whether the enabling time interval since the state of the computing device was set to non-wakeable state has lapsed or not. For example, the power state engine(s) 104 may determine whether the enabling time interval 214 has elapsed based on the timer(s) 210. The timer(s) 210 may have been set based on the value of the enabling time interval 214. In such cases, expiration of the timer(s) 210 indicates that the enabling time interval 214 has lapsed. On determining that the enabling time interval 214 has not yet lapsed ('No' path from block 410), the power state engine(s) 104 maintains the non-wakeable state of the computing device(s) 102 (block 412). As mentioned previously, while the computing device(s) 102 is in the non-wakeable state, it remains unresponsive to any triggers. The method then proceeds to block 410 to yet again determine whether the enabling time interval 214 has lapsed. Such a determination continues till the enabling time interval 214 has not lapsed.

On determining that the enabling time interval 214 has in fact lapsed ('Yes' path from block 410), the power state engine(s) 104 sets the state of the computing device(s) 102 as wakeable state through a trigger (block 414). While in the wakeable state, the computing device(s) 102 may be switched into an active mode from the low powered mode through any trigger.

At block 416, the computing device may be switched to an active mode on the low powered mode on detecting a trigger. For example, after the enabling time interval 214 has lapsed and the computing device(s) 102 has been switched into the wakeable state, any input from an input device switches the computing device(s) 102 from the low powered mode to the active mode.

Figure 5:
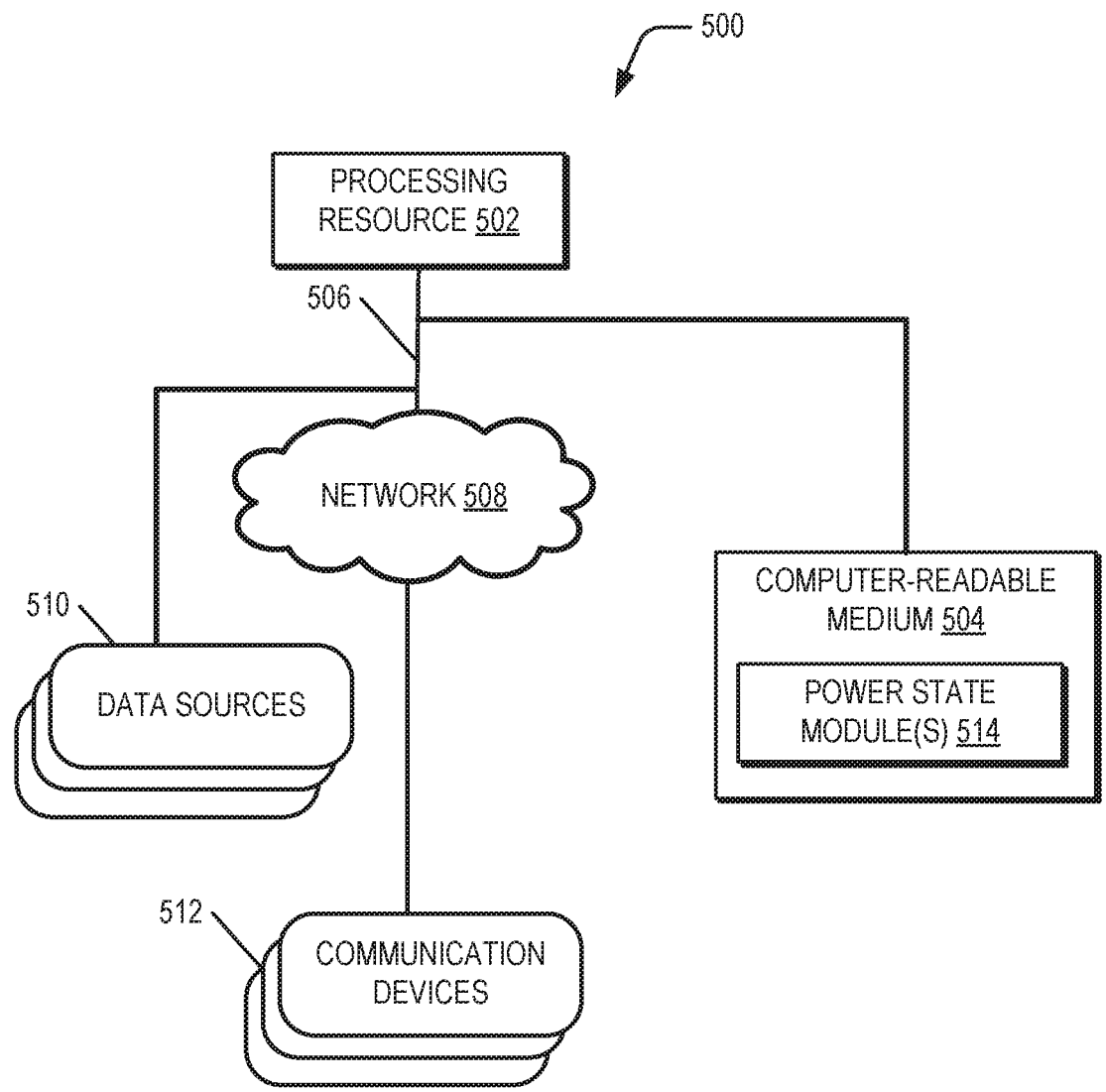
FIG. 5 is a block diagram of an example system implementing a non-transitory computer-readable medium, to set a system state as one of wakeable and non-wakeable through a trigger.

FIG. 5 illustrates a system environment 500 for setting a system state as one of wakeable through a trigger and non-wakeable, according to an example of the present disclosure. The system environment 500 may comprise at least a portion of a public networking environment or a private networking environment, or a combination thereof. In one implementation, the system environment 500 includes a processing resource 502 communicatively coupled to a computer readable medium 504 through a communication link 506.

For example, the processing resource 502 can include one or more processors of a computing device. The computer readable medium 504 may be, for example, an internal memory device of the computing device or an external memory device. In one implementation, the communication link 506 may be a direct communication link, such as any memory read/write interface. In another implementation, the communication link 506 may be an indirect communication link, such as a network interface. In such a case, the processing resource 502 can access the computer readable medium 504 through a network 508. The network 508 may be a single network or a combination of multiple networks and may use a variety of different communication protocols.

The processing resource 502 and the computer readable medium 504 may also be coupled to data sources 510 through the communication link 506, and/or to communication devices 512 over the network 508. The coupling with the data sources 510 enables in receiving the data in an offline environment, and the coupling with the communication devices 512 enables in receiving the data in an online environment.

In one implementation, the computer readable medium 504 includes a set of computer readable instructions, implementing a power state module(s) 514. The power state module(s) 514 may be implemented within computing device(s) 102. The instructions implementing power state module(s) 514 may, in one example, be executable code for setting a system state as one of wakeable through a trigger and non-wakeable. The set of computer readable instructions within medium 504 may be accessed by the processing resource 502 through the communication link 506 and subsequently executed to process data communicated with the data sources 510 for affecting the approaches as discussed previously.

In one example, the power state module(s) 514 receives a value of enabling time interval 214 provided by a user through a command. Thereafter, the power state module(s) 514 may further generate control instructions which when processed may further switch a computing device(s) 102 from an active mode to a low powered mode. Once the computing device(s) 102 is switched to the low powered mode, the power state module(s) 514 may further initiate a timer, such as the timer(s) 210, to determine whether the enabling time interval 214 has lapsed or not.

The power state module(s) 514 may set the state of the computing device(s) 102 a non-wakeable state. While the computing device(s) 102 is in the non-wakeable state, the computing device(s) 102 is rendered unresponsive to any trigger received, for example, through a manual input. Thereafter, the power state module(s) 514 may maintain the computing device(s) 102 in the non-wakeable state till a time interval equivalent to the value of the enabling time interval 214 elapses. Till the enabling time interval 214 has not ended, the power state module(s) 514 maintains the computing device(s) 102 in the non-wakeable state.

As the enabling time interval 214 elapses, the power state module(s) 514 sets the computing device(s) 102 to a wakeable state. While in the wakeable state, the computing device(s) 102 may be switched into an active mode from the low powered mode through any trigger. As the computing device(s) 102 is switched into the active mode, execution of the other engine(s) 212 or applications may be initiated. In one example, the applications which are to be initiated as the computing device(s) 102 is switched to an active mode, may be based on the system state data 216. The system state data 216 may indicate information pertaining to the applications which were open or executing at the time the computing device(s) 102 was switched to the low powered mode. As would be noted, the computing device(s) 102 remains unresponsive to any triggers during the non-wakeable state but may be woken up once the enabling time interval 214 has lapsed.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

We claim:

1. A computing device comprising:
a power state engine, wherein the power state engine is to:
obtain a value of an enabling time interval based on system state data, wherein the system state data indicates information pertaining to an application executing on the computing device;
determine if the enabling time interval has elapsed since the computing device has been in a low powered mode; and
based on determining, set a system state as one of a wakeable state and a non-wakeable state,
wherein in the non-wakeable state, the computing device is in the low power mode and is not switched to an active mode through a trigger, and
wherein in the wakeable state, the computing device is in the low power mode and switches to an active mode based on the system state data through the trigger.

2. The computing device as claimed in claim 1, wherein the power state engine, on determining that the enabling time interval has elapsed, is to:
set the system state as the wakeable state; and
on receiving the trigger, switch the computing device from the low powered mode to an active mode based on the system state data.

3. The computing device as claimed in claim 1, wherein the computing device is switched to the low powered mode based on one of user input and the computing device running idle for a predefined time.

4. The computing device as claimed in claim 1, wherein the trigger comprises a manual input received through an input device coupled to the computing device.

5. The computing device as claimed in claim 1, further comprising a timer for tracking time elapsed for which the computing device has been in the low powered mode.

6. The computing device as claimed in claim 1, wherein the low powered mode is compliant with Advanced Configuration and Power Interface (ACPI) specification.

7. The computing device as claimed in claim 1, wherein the power state engine, prior to obtaining the enabling time interval, is to switch the computing device from an active mode to the low powered mode in response to a user command.

8. A method comprising:
during an active mode of a computing device, receiving a value of an enabling time interval based on system state data, wherein the system state data indicates information pertaining to an application executing on the computing device;
switching the computing device from the active mode to a low powered mode in response to a user command;
on switching the computing device to the low powered mode, activating a timer within the computing device; and
setting a system state for the computing device as a non-wakeable state through a trigger, wherein in the non-wakeable state, the computing device is not switchable to the active mode through the trigger prior to the lapse of the enabling time interval.

9. The method as claimed in claim 8, wherein the method further comprises:
when the enabling time interval has lapsed, setting the system state as a wakeable state through a trigger, wherein the computing device is switchable to the active mode through the trigger in the wakeable state based on the system state data.

10. The method as claimed in claim 8, wherein the low powered mode is Sleep (S3), Hibernate (S4), or Shutdown (S5) defined by the Advanced Configuration and Power Interface (ACPI) specification.

11. The method as claimed in claim 8, wherein the trigger is one of user provided and system provided.

12. The method as claimed in claim 11, wherein the trigger provided by the user is a manual input received through an input device coupled to the computing device.

13. A non-transitory computer-readable medium comprising instructions executable by a processing resource to:
set a value of an enabling time interval based on system state data in response to a user input received by a computing device, wherein the system state data indicates information pertaining to an application executing on the computing device;
switch the computing device to a low powered mode from an active mode; and
during the low powered mode, change a system state for the computing device from a non-wakeable state to a wakeable state through a trigger based on the system state data after the enabling time interval has lapsed, wherein the computing device is switchable to the active mode from the low powered mode based on the system state data through the trigger in the wakeable state.

14. The computer-readable medium as claimed in claim 13, wherein the instructions are to further initiate a timer on switching the computing device to the low powered mode.

15. The computer-readable medium as claimed in claim 13, wherein the instructions executable by the processing resource are to generate a user interface to set the value of the enabling time interval.

* * * * *